Aug. 9, 1932.  J. G. DOUGLAS  1,870,325
MEANS FOR PRODUCING WORMS OR CYLINDRICAL CAMS
Filed Nov. 16, 1929    4 Sheets-Sheet 1
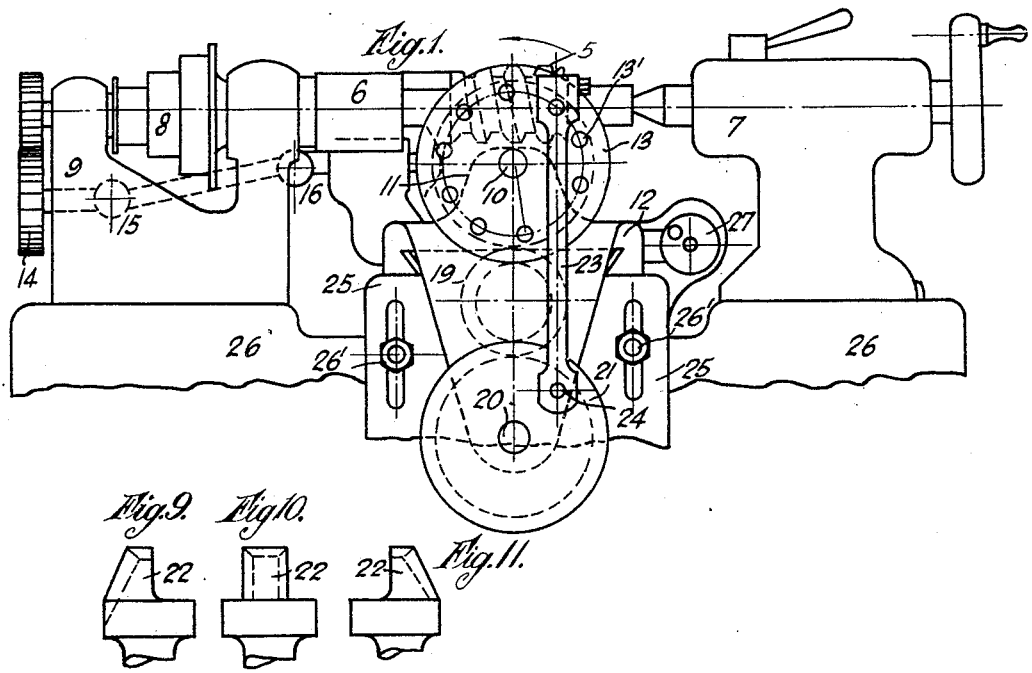
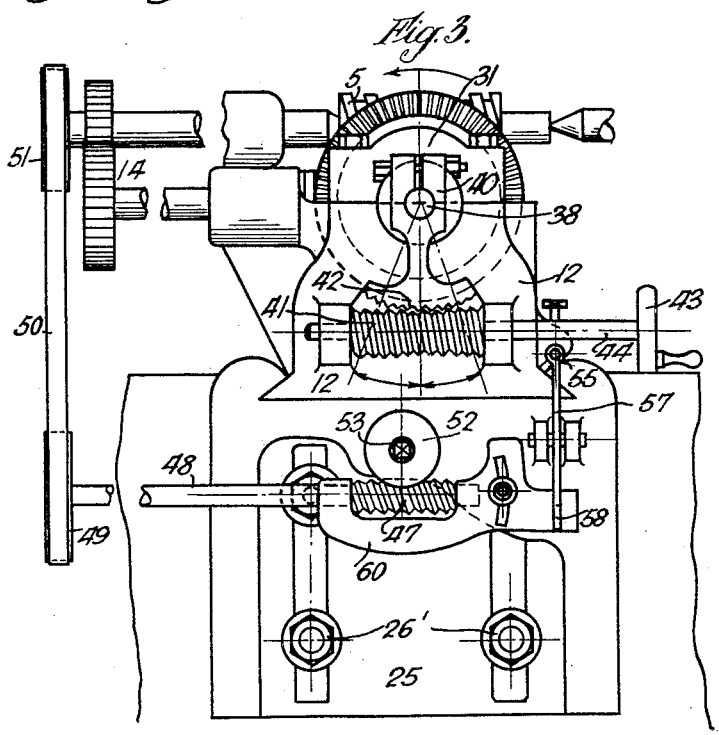
INVENTOR
J. G. Douglas
BY Baldwin & Wight
His ATTORNEYS Aug. 9, 1932. J. G. DOUGLAS 1,870,325
MEANS FOR PRODUCING WORMS OR CYLINDRICAL CAMS
Filed Nov. 16, 1929 4 Sheets-Sheet 2

INVENTOR
J. G. Douglas
BY
Bremont Wight
His ATTORNEYS

Aug. 9, 1932.   J. G. DOUGLAS   1,870,325
MEANS FOR PRODUCING WORMS OR CYLINDRICAL CAMS
Filed Nov. 16, 1929    4 Sheets-Sheet 3

INVENTOR
J. G. Douglas
BY
Bachrach & Wight
His ATTORNEYS

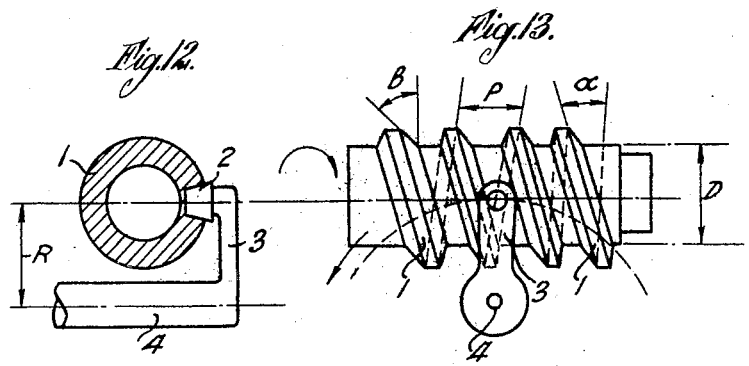
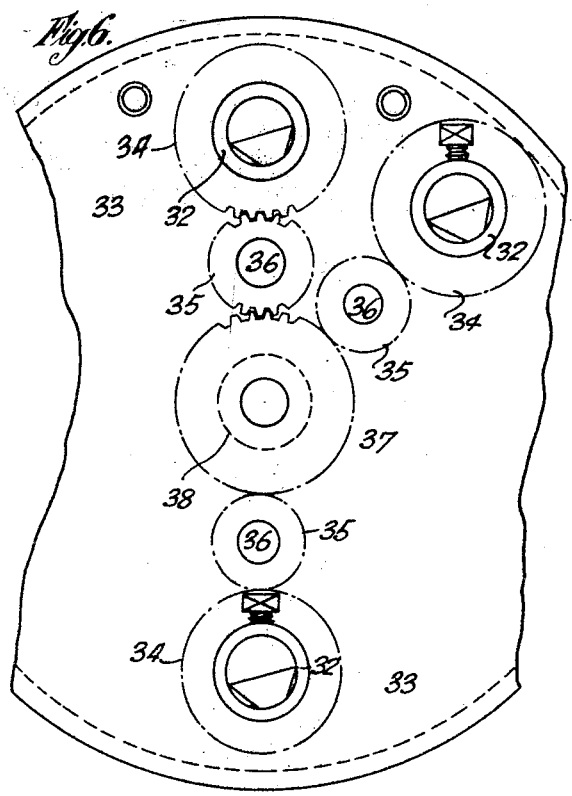

Patented Aug. 9, 1932

1,870,325

UNITED STATES PATENT OFFICE

JOHN GEORGE DOUGLAS, OF LEAGRAVE, LUTON, ENGLAND, ASSIGNOR TO GEORGE KENT, LIMITED, OF LONDON, ENGLAND

MEANS FOR PRODUCING WORMS OR CYLINDRICAL CAMS

Application filed November 16, 1929, Serial No. 407,756, and in Great Britain November 20, 1928.

This invention relates to means for producing worms or cylindrical cams (hereinafter referred to as worms) for imparting movement to a peg or conical roller (hereinafter referred to as the peg) along the arc of a circle and for imparting the same corresponding movement to the peg for a given angular movement of the worm at any position of engagement, the peg maintaining perfect engagement with the flanks of the worm and not requiring movement in a plane at right angles to that containing the line of movement.

According to the present invention a cutting machine comprises a rotatable tool holder, a cutting tool rotatably mounted in said tool holder the distance between the axis of rotation of the tool holder and of the tool being equal to the radius of the arc, and means for maintaining the cutting edge of the tool at right angles, or substantially at right angles to the helix angle of the worm or cam during the movement of the tool holder.

Means, operable either manually or automatically, may be provided for adjusting the angle of the face of the tool with respect to the helix angle of the worm.

Figure 2:
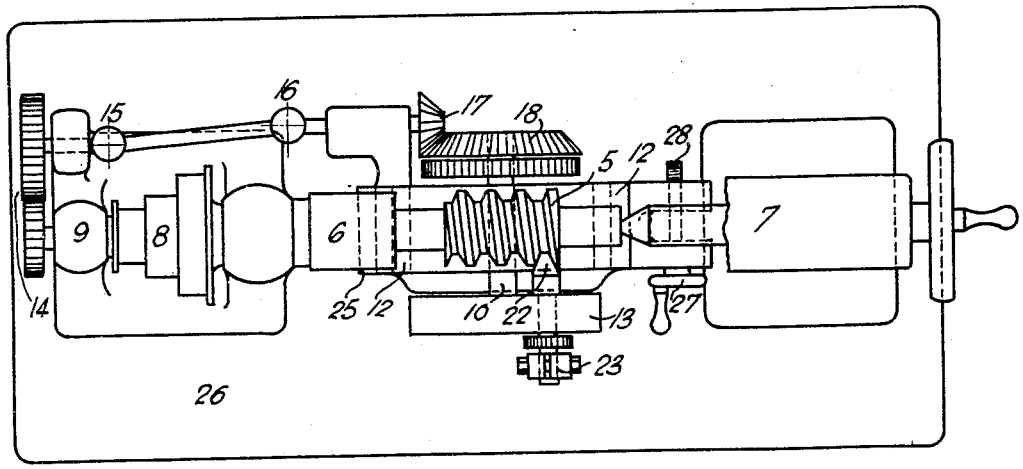
Figure 5:
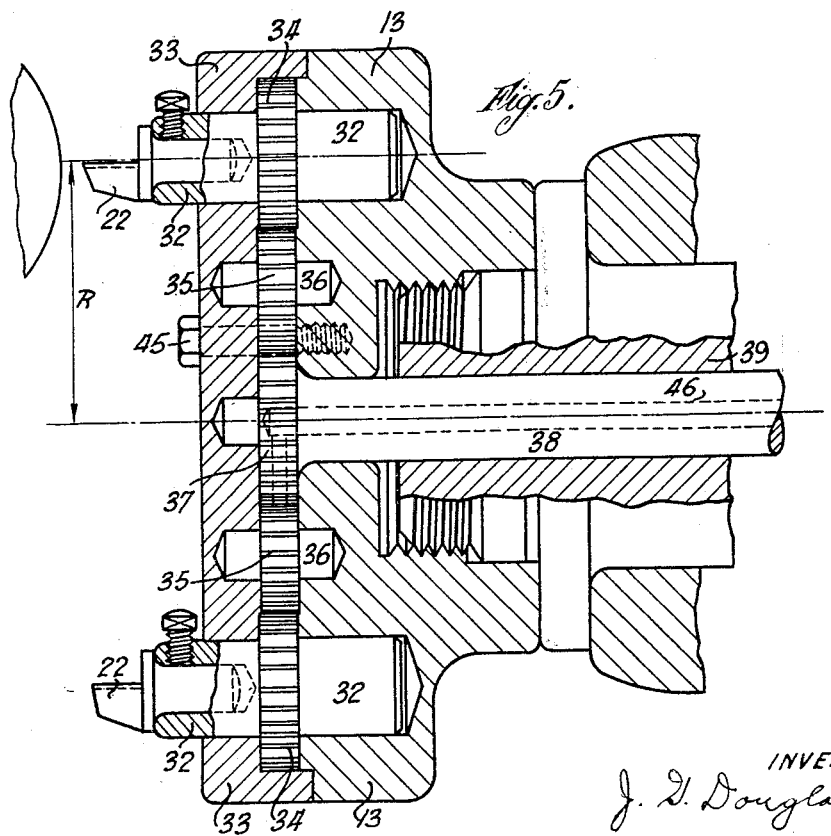
Figure 7:
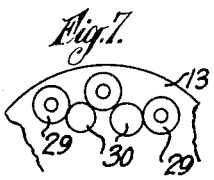
Figure 8:
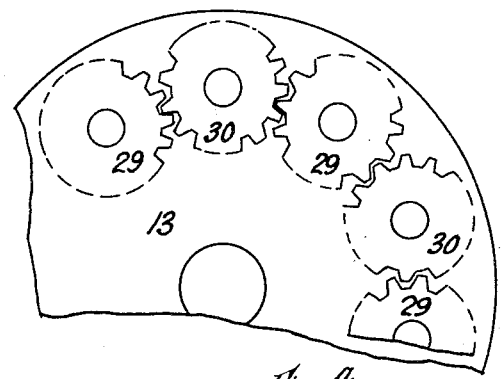
Figure 4:
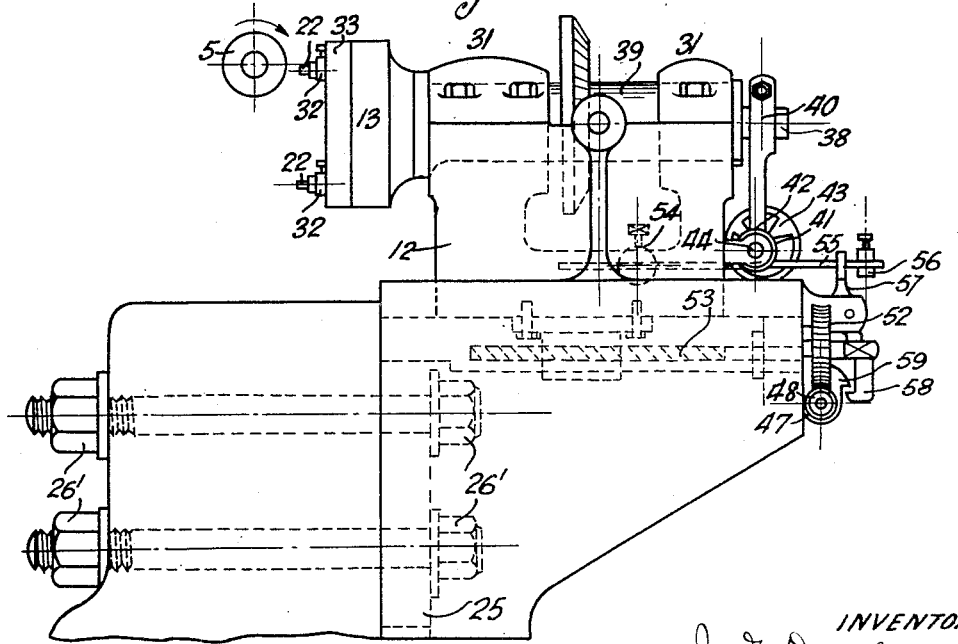

The invention is illustrated in the accompanying drawings in which Fig. 1 is a side elevation, Fig. 2 a part plan of one form of construction, Fig. 3 a part end elevation, Fig. 4 a side elevation and Figs. 5, 6, and 7 detail views of a modified form of construction and Fig. 8 a diagrammatic view of a further modification. Figs. 9, 10, 11 are views of the cam forming tools and Figs. 12 and 13 views at right angles to one another of a steering gear employing a cam which the machines are capable of producing.

Referring more particularly to Figs. 12 and 13 which illustrate a steering gear having a worm or cam which the machine is particularly adapted to produce 1 indicates the worm or cam which is engaged by a peg 2 mounted with its axis at right angles to the face of an arm 3 secured to a rocker shaft 4, the peg being thereby restrained to move across the worm or cam in the arc of a circle whose radius is R.

It is impracticable to generate such a worm by the usual methods of worm cutting or hobbing, nor can it be formed from a master worm, owing to the fact that pitch P, helix angle $\alpha$, flank angle $\beta$, and core diameter D, all vary by inconstant amounts from end to end of the worm.

Referring now to Figs. 1, 2, 9, 10 and 11, 5 indicates a worm blank which is mounted on a mandrel 6 and on a tailstock 7. The mandrel is driven from a stepped pulley 8 around which passes a driving belt, the pulley being carried in a headstock 9.

A shaft 10, mounted in bearings 11 on a slide 12 passes under the worm blank 5 at right angles to the axis thereof in exactly the same position relatively to the blank as the shaft 4 on which the arm 3 carrying the peg 2 is mounted with respect to the finished worm.

A tool carrying disc 13 is attached to the forward end of the shaft 10 the radius from the centre of the disc to the centre of tool holes 13′ formed in the disc being equal to the radius R of the arm 3.

The shaft 10 is driven from the stepped pulley 8 by change wheel gearing 14 through universal joints 15, 16 and bevel gears 17, 18 so that the disc 13 rotates with the worm blank at speeds proportionate to the change gears used. The shaft 10 is also, by an intermediate gear wheel 19, geared to a shaft 20 fast with a disc 21 so that said disc 21 revolves at the same speed and in the same direction as the tool disc 13.

A tool indicated at 22 is mounted to revolve in the tool disc 13 and is rigidly held in the upper end of a connecting rod or link 23, the lower end of which is mounted on a stud 24 on the disc 21.

The slide 12 is carried by a bed 25 capable of being raised or lowered with respect to the machine frame 26 and locked in position by bolts 26′, thus enabling the tools to be moved to any desired position with respect to the axis of the worm blank.

The slide 12 can be advanced towards the blank and withdrawn by a handwheel 27 and screw 28 or by a suitable automatic feeding device operable by change gears.

In operation, if the worm blank 5 be rotated, the tool 22 will pass across the blank and generate a worm of the required form, according to the change gears employed, and the shape of the tool.

The connecting rod or link 23 maintains the cutting edges of the tool approximately at right angles to the helix angle of the worm during the time that the tool is describing an arc across the blank.

If desired, a plurality of tools may be employed the tools being mounted in the tool holes 13' and the tools are geared together as is shown either in Fig. 7 or in Fig. 8. In Fig. 7 each tool is fast with a gear wheel 29 and the gear wheels intergeared by idler pinions 30 arranged out of the pitch circle of the tool holes one tool being fast with the upper end of the connecting rod, as has been described. Such an arrangement can be employed where it is desired to employ tools in every tool hole 13'. When however every other tool hole is required, the arrangement shown in Fig. 8 is employed, in which arrangement the intermediate gear wheels 30 are located on the pitch circle of the tool holes. The gears are such that all the tools move at the same rate about their axes.

When a plurality of tools is employed the arrangement of the tools may be such that one cuts the left hand flank, another cuts the core only, and another cuts the right hand flank, the sequence being repeated, according to the number of tool positions available the tools being illustrated in Figs. 9, 10, 11.

In the modification shown in Figs. 3, 4 and 5 which is adapted for use when the spindle 10 cannot pass under or over the worm blank 5 owing to a short arm radius R, the tool disc is supported from one side only by bearings 31 mounted on the slide 12. The tools are secured in spindles 32 rotatably mounted in both the disc 13 and in a disc cover plate 33. The spindles 32 are formed with gear wheels 34 meshing with intermediate gear wheels 35, the spindles 36 of which are rotatably mounted in the disc 13 and cover plate 33. The intermediate gear wheels are also in mesh with a central gear wheel 37 which is of the same diameter as those fast with the tool spindles and is secured to a central shaft 38 passing through a sleeve 39 to which the disc 13 is secured. The central shaft 38 and hence the gear wheel fast therewith, are held stationary by an arm 40. The tools illustrated in this modification are each of a shape corresponding to the cross sectional contour of the thread to be cut in the blank, although obviously the tools illustrated in Figures 9, 10, and 11 could be employed.

In operation, rotation of the disc 13, cover plate 33, tool spindle gear wheels 34 and intermediate gear wheels 35 around the fixed gear wheel 37 imparts the same action to the tool spindles 32 and therefore to the tools as the connecting rod in the previously described arrangement, that is, if the face of the tool be set at right angles to the helix angle of the worm at the point of entry of the tool to the cam, the said face will remain at right angles to the helix angle from the point of entry to the point of exit.

With worms having a very short arm radius R, the helix angle does not remain constant, but becomes smaller at each end of the worm. The arm 40 preventing the central shaft and gear wheel fast therewith from rotating, is made so that it, and therefore the said shaft 38 and gear wheel 37, can be rotated to a sufficient extent on either side of the original central position through a worm 41 and segment 42 the arm 40 remaining in the central position until the tools have advanced their full depth into the blank.

This slight partial rotation backward and forward can be effected either by a hand wheel 43 having a spindle 44 fast with the worm 41, or by suitable automatic means, reversing worm, cams or connecting rod and crank attachment or the like, driven from the machine spindle. This causes the central fixed gear wheel 37 to turn slightly to the left and right of its original position, which movement in turn causes the tool spindles 32 and tools 22 to rotate slightly on either side of their original position, the faces of the tools then being presented at right angles to the helix angle from end to end of the blank.

Any number of gear and tool spindle trains can be used in the disc, provided that the distance between the centres of the tool spindes is either the required pitch P of the worm or a multiple of such pitch, and that such distance will divide exactly into the circumference of a circle of the radius R of the arm carrying the pin or roller.

The disc cover plate 33 may be spigoted to the disc and secured by bolts 45 which pass through the cover plate into tapped holes between the tool spindle gear wheels, or by other suitable means; the gear wheels may if desired be recessed into the face of either the disc or the cover plate or both.

Oil may be supplied under pressure through a passage 46 in the central shaft to the gear wheels. The intermediate gear wheels may be of any desired diameter and may be mounted on adjustable centres (not on the straight line joining the centres of the fixed and tool spindle gear wheels), so that said gear wheels can be adjusted more deeply into mesh to remove any backlash.

If desired means may be provided for automatically feeding the tools towards the worm and for automatically rendering the feeding movement inoperative at a predetermined depth of cut. The arrangement may comprise a worm 47 fast with a spindle 48 fast with a belt pulley 49 around which passes a belt 50 passing around a pulley 51 driven by the stepped pulley 8. The worm 47 is in mesh with a worm wheel 52 fast on a feed screw 53. The slide 12 is provided with a boss 54 in which is adjustably clamped a striking rod 55 having a striker 56 adapted to engage a lever 57 having a detent beak 58 which when released from engagement with a detent 59 allows a bracket 60 carrying the worm 47 to fall and thus to allow the worm to drop out of engagement with the wheel 52 and thus stopping the feeding movement.

What I claim is:—

1. In a machine for cutting a worm or cam, the combination of a rotatable work holding means, a tool carrier rotatable on an axis substantially at a right angle to the axis of the work holding means adapted to carry a planing-tool type of cutter, means for maintaining the cutting edge of the cutter substantially at right angles to the helix angle of the worm, and means for rotating said work holding means and carrier in timed relationship.

2. In a machine for cutting a worm or cam, the combination of rotatable work holding means, a rotatable carrier having its axis at a right angle to the axis of said means and having an opening therethrough parallel to its axis, a planing-tool type of cutter disposed in said opening, means for rotating said work holding means and carrier in timed relationship, a rotatable member, means driving said member and tool carrier for rotation at the same speed, a link pivoted to said member and carrying said cutter.

3. In a machine for cutting a worm or cam for cooperation with a peg or roller in the manner referred to, the combination of a rotatable work holder, a rotatable planing tool type of cutter carrier adapted rotatably to receive a tool at a distance from the axis of rotation of the carrier equal to the radius of the arc along which the peg is to be moved, means for rotating said work holder and tool carrier in timed relationship, and means for maintaining the cutting edge of the cutter substantially at right angles to the helix angle of the worm.

4. In a machine for cutting a worm or cam for cooperation with a peg or roller in the manner referred to, the combination of a rotatable work holder, a rotatable tool carrier adapted rotatably to receive a planing tool type of cutter at a distance from the axis of rotation of the carrier equal to the radius of the arc along which the peg is to be moved, means for rotating said work holder and tool carrier in timed relationship, a rotatable member, means for rotating the rotatable member and the tool carrier at the same speed, a link pivotally connected at one end to said rotatable member at a distance equal to the radius of the arc, and means for clamping the other end of the link to the cutter.

5. In a machine for cutting a worm or cam for cooperation with a peg or roller in the manner referred to, the combination of a rotatable work holder, a rotatable tool carrier adapted rotatably to receive a planing tool type of cutter mounted in said carrier at a distance from the axis of rotation of the tool holder equal to the radius of the arc along which the peg is to be moved, means for rotating said work holder and tool carrier in timed relationship, a planetary gear wheel rotatably mounted on the tool holder and adapted to be placed in driving engagement with the cutter, and a central sun wheel in mesh with the planetary gear wheel, the gear ratio of said planetary gear wheel and said sun wheel being such as to maintain the cutting edge of the cutter substantially at right angles to the helix angle of the worm.

6. In a machine for cutting a worm or cam for cooperation with a peg or roller in the manner referred to, the combination of a rotatable work holder, a rotatable tool carrier adapted rotatably to receive a planing tool type of cutter rotatably mounted in said tool holder at a distance from the axis of rotation of the tool holder equal to the radius of the arc along which the peg is to be moved, means for rotating said work holder and carrier in timed relationship, a planetary gear wheel rotatably mounted on the tool carrier and adapted to be placed in driving engagement with the cutter, a central sun wheel in mesh with the planetary gear wheel and means for turning the sun wheel, the gear ratio of said planetary gear wheel and said sun wheel being such as to maintain the cutting edge of the cutter substantially at right angles to the helix angle of the worm.

7. In a machine for cutting a worm or cam for cooperation with a peg or roller in the manner referred to, the combination of a rotatable work holder, a rotatable tool carrier adapted rotatably to receive a plurality of planing tool type of cutters mounted in said carrier at a distance from the axis of rotation of the carrier equal to the radius of the arc along which the peg is to be moved, means for rotating said work holder and tool carrier in timed relationship, and means for maintaining the cutting edge of the cutters substantially at right angles to the helix angle of the worm.

8. In a machine for cutting a worm or cam for cooperation with a peg or roller in the manner referred to, the combination of a rotatable work holder, a rotatable tool carrier adapted rotatably to receive a plurality of planing tool type of cutters at a distance from the axis of the rotation of the tool holder equal to the radius of the arc along which the peg is to be moved, means for rotating said work holder and carrier in timed relationship, a rotatable member, means for connecting said member and the tool carrier so that they rotate together at the same speed, a link pivotally connected at one end to said member at a distance equal to the radius of the arc, means for clamping the other end of the link to a cutter, and means for interconnecting the cutters.

9. In a machine for cutting a worm or cam for cooperation with a peg or roller in the manner referred to, the combination of a rotatable work holder, a rotatable tool carrier adapted rotatably to receive a plurality of planing tool type of cutters at a distance from the axis of rotation of the tool holder equal to the radius of the arc along which the peg is to be moved, means for rotating said work holder and carrier in timed relationship, planetary gear wheels rotatably mounted on the tool carrier and adapted to be placed in driving engagement with the cutters, and a central sun wheel in mesh with the planetary gear wheels, the gear ratio of said planetary gear wheels and said sun wheel being such as to maintain the cutting edge of the cutter substantially at right angles to the helix angle of the worm.

10. In a machine for cutting a worm or cam for cooperation with a peg or roller in the manner referred to, the combination of a rotatable work holder, a rotatable tool carrier adapted rotatably to receive a plurality of planing tool type of cutters at a distance from the axis of rotation of the tool holder equal to the radius of the arc along which the peg is to be moved, means for rotating said work holder and carrier in timed relationship, planetary gear wheels rotatably mounted on the tool carrier and adapted to be placed in driving engagement with the cutters, a central sun wheel in mesh with the planetary gear wheels, the gear ratio of said planetary gear wheels and said sun wheel being such as to maintain the cutting edge of the cutter substantially at right angles to the helix angle of the worm, and means for turning the sun wheel.

11. In a machine for cutting a worm or cam for cooperation with a peg or roller in the manner referred to, the combination of a rotatable work holder, a rotatable tool carrier, adapted rotatably to receive a plurality of planing tool type of cutters at a distance from the axis of rotation of the tool holder equal to the radius of the arc along which the peg is to be moved, the cutters being adapted respectively to cut the flanks and root of the work, means for rotating said work holder and carrier in timed relationship, and means for maintaining the cutting edges of the cutters substantially at right angles to the helix angle of the worm.

12. In a machine for cutting a worm or cam, the combination of a rotatable work holding means, a tool carrier rotatable on an axis substantially at a right angle to the axis of the work holding means adapted to carry a planing-tool type of cutter with the cutting edge thereof substantially at right angles to the helix angle of the worm, means for rotating said work holding means and carrier in timed relationship, a rotatable member, means for rotating the carrier at the same speed as the rotatable member, a link pivoted to said rotatable member, and the other end of the link being adapted for connection to the cutter.

In testimony that I claim the foregoing as my invention, I have signed my name this 31st day of October, 1929.

JOHN GEORGE DOUGLAS.